United States Patent

Miyano

[11] Patent Number: 5,820,098
[45] Date of Patent: Oct. 13, 1998

[54] STRUCTURAL FRAME FOR SLANT-BED MACHINE TOOL

[76] Inventor: Toshiharu Tom Miyano, c/o Miyano Machinery USA Inc., 940 N. Central Ave., Wood Dale, Ill. 60191

[21] Appl. No.: 626,508

[22] Filed: Apr. 2, 1996

Related U.S. Application Data

[63] Continuation-in-part of Ser. No. 543,061, Oct. 13, 1995, abandoned.

[51] Int. Cl.$^6$ .................................................. B23B 17/00
[52] U.S. Cl. ............................................. 248/637; 82/149
[58] Field of Search .................................. 248/637, 671, 248/673, 676, 678; 82/149, 27 R, 27 C

[56] References Cited

U.S. PATENT DOCUMENTS

| | | | |
|---|---|---|---|
| 3,288,003 | 11/1966 | Luebkemann | 82/149 X |
| 3,307,438 | 3/1967 | Bottger et al. | 82/149 X |
| 3,837,245 | 9/1974 | Schuler et al. | 82/32 |
| 4,286,484 | 9/1981 | Gatzki | 82/149 |

FOREIGN PATENT DOCUMENTS 0148933  6/1981  Germany .................. 82/149

Primary Examiner—Ramon O. Ramirez
Assistant Examiner—Long Dinh Phan
Attorney, Agent, or Firm—Wood, Phillips, VanSanten, Clark & Mortimer

[57] ABSTRACT

A slant-bed structural frame is provided for a slant-bed machine tool. The structural frame includes a bed element having a first flat surface on which the bed element can be supported in a machining position and a second machined, flat surface that is parallel to the first surface and at least partially formed with the bed element supported on the first surface. The second surface defines a support for an operating component of the machine tool. Additionally, a base element is provided having a third surface. The third surface cooperates with a surface on the bed element to maintain the bed element in an operative position on the base element, wherein the second surface is neither fully vertical nor fully horizontal.

10 Claims, 5 Drawing Sheets

STRUCTURAL FRAME FOR SLANT-BED MACHINE TOOL

CROSS-REFERENCE TO RELATED APPLICATION

This application is a continuation-in-part of Ser. No. 08/543,061, filed Oct. 13, 1995, now abandoned.

FIELD OF THE INVENTION

This invention relates to structural frames for supporting machine tool components, and more particularly, to structural frames for slant-bed machine tools and a method for making the same.

BACKGROUND OF THE INVENTION

Structural frames for slant-bed machine tools, in particular for slant-bed CNC lathes, are well known in the prior art. Such frames position the machine tool operating components and the mount surfaces therefor at a slant angle that is neither fully vertical nor fully horizontal.

One advantage of the slant-bed configuration is the reduction in thermal distortion of the bed structure caused by machining debris accumulation on the bed structure. By utilizing gravitational forces, the slant angle of the slant-bed facilitates an increased rate of machining debris disposal from the slant-bed, thereby reducing the amount of heat which is transferred from the machine debris to the bed.

Accuracy and high production are two of the factors considered when selecting the slant angle for a slant-bed machine tool that is intended for a particular application. Obviously, steeper slant angles tend to increase the machining debris disposal rate and therefore are preferred for high production applications that generate machining debris at a relatively high rate. However, the accuracy of the machine tool decreases as the slant angle is increased because the torque exerted on the structural frame by the cantilevered machine tool components increases.

Another factor that is considered when selecting a slant-bed machine tool is the compatibility of the slant-bed machine tool with existing production lines of the machine tool users, and in particular, with the material-handling systems of the existing production lines. The compatibility of the slant-bed machine tool is largely dependent upon the slant angle provided by the slant-bed machine tool.

Accordingly, when selecting the slant angle for a slant-bed structural frame intended for use in a particular application, there is usually a balancing between the considerations of accuracy, production and compatibility.

Typically, the structural frames for slant-bed machine tools incorporate a bed element having a machined surface for supporting the operating components of the machine tool. The bed element is normally produced from cast iron having a substantially trapezoidal cross section defined by two parallel surfaces and two nonparallel surfaces. One of the nonparallel surfaces defines the slant angle and one of the parallel sides defines either a base surface or a mating surface for attachment to a separate base element. Normally, the nonparallel surface defining the slant angle is machined on a gantry-type milling machine to produce the machined surface for supporting the operating components of the machine tool. During this machine operation, the bed element is supported in a custom jig which positions the bed element so that the nonparallel surface is parallel with the horizontal machining plane of the milling machine.

One disadvantage of this type of bed element is that a customized iron casting, with associated mold tooling, must be provided for each of the various slant angles that may be dictated by considerations of production, accuracy, and compatibility generated by various machining applications. A slant-bed machine tool manufacturer may be limited as to the number of slant angles that are offered because of the expense associated with producing, storing, and maintaining the different sets of mold tooling required for each of the different castings.

Another disadvantage of this type of structural frame is that a separate custom jig may have to be provided for each of the different castings so that the machined surface is positioned parallel to the horizontal machining plane of the gantry-type milling machine. Again, a slant-bed machine tool manufacturer may be limited as to the number of slant angles that are offered for the slant-bed machine tools because of the expense associated with producing, maintaining, and storing each of the different jigs.

A further disadvantage of this type of structural frame is that the use of the custom jig in the machining of the component mount surface may limit the size of the milling machines that are capable of accommodating both the bed element and the custom jig. Obviously, there is an increased cost associated with purchasing larger sizes of milling machines and providing the requisite floor space.

Another disadvantage associated with this type of structural frame is that the substantially trapezoidal cross section of the bed element complicates the analysis of the thermal and stress-related distortions of the bed element. Further, because every slant angle requires a bed element having a different trapezoidal cross section, these complicated analyses must normally be completely repeated every time a slant-bed machine tool having a different slant angle is added to the product line offered by a slant-bed machine tool manufacturer.

Yet another disadvantage associate with this type of structural frame is that the assembly of the operating components onto the structural frame may be complicated by the semi-vertical orientation of the slant bed frame. Typically, special assembly tools must be made to support the weight of each of the machining components as it is being assembled onto the slant-bed frame. The special assembly tools represent additional expense.

SUMMARY OF THE INVENTION

In accordance with the present invention, a slant-bed structural frame is provided for a slant-bed machine tool. The structural frame includes a bed element having a first flat surface on which the bed element can be supported in a machining position and a second machined, flat surface that is parallel to the first surface and at least partially formed with the bed element supported on the first surface. The second surface defines a support for an operating component of the machine tool. Additionally, a base element is provided having a third surface. The third surface cooperates with a surface on the bed element to maintain the bed element in an operative position on the base element wherein the second surface is neither fully vertical nor fully horizontal.

In one form of the invention, the operative position on the base element is selected to compensate for gravity-induced deflection of the bed element.

In one form, the first flat surface of the bed element is a cast surface.

In one form, the bed element has a fourth surface and the third surface on the base element cooperates with at least one of the first surface and the fourth surface to maintain the bed element in an operative position on the base element wherein the second surface is neither fully vertical nor fully horizontal.

In one form of the invention, a structural frame kit is provided for a slant-bed machine tool whereby the frame kit provides a selection of bed slant angles. The frame kit includes a bed element having a machined, flat surface defining a support for an operating component of the machine tool. A first base element is provided having a surface cooperating with a first surface on the bed element to maintain the bed element in an operative position on the first base element wherein the machined, flat surface of the bed element is at a first slant angle that is neither fully vertical nor fully horizontal. A second base element is provided having a surface cooperating with the first surface on the bed element to maintain the bed element in an operative position on the shoe wherein the machined flat surface of the bed element is at a second slant angle that is neither fully vertical nor fully horizontal. The second slant angle provided by the second base element is different from the first slant angle provided by the first base element. The bed element is selectively-mated with only one of the first and second base elements to provide one of the first and second slant angles.

In one form of the invention, the first surface is a flat surface on which the bed element can be supported in the machining position. The machined, flat surface is parallel to the first surface and at least partially formed with the bed element supported on the first surface.

In accordance with one aspect of the present invention, a process is provided for manufacturing a structural frame for a slant-bed machine tool. The process includes the steps of forming a bed element having a first flat surface on which the bed element can be supported in a machining position; supporting the bed element on the first flat surface in the machining position; machining a second flat surface on the bed element, the second surface defining a support for an operating component of the machine tool; and forming a first base element having a third surface for maintaining the bed element in an operative position on the first base element wherein the second surface of the bed element is at a first slant angle that is neither fully vertically nor fully horizontal.

In one form of the invention, the process further includes the step of mating together the bed element and the first base element at the third surface.

In one form of the invention, the process further includes the steps of forming a second base element having a fourth surface for maintaining the bed element in an operative position on the shoe wherein the second surface of the bed element is at a second slant angle that is neither fully vertical nor fully horizontal, with the second slant angle being different from the first slant angle; and selectively mating together the bed element and one of the first base element at the third surface and the second base element at the fourth surface.

DETAILED DESCRIPTION OF THE PREFERRED EMBODIMENTS

Figure 1:
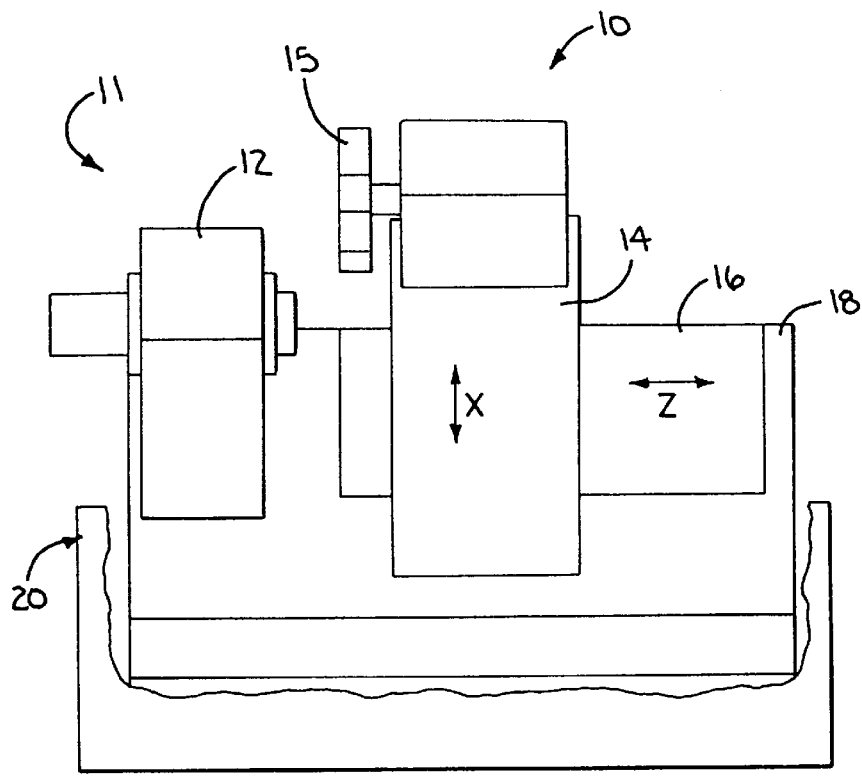
FIG. 1 is a front elevation view of a conventional slant-bed machine tool.

A front elevation view of a prior art, slant-bed machine tool 10 is illustrated in FIG. 1 in the form of a CNC (Computer Numerical Controlled) lathe. The lathe 10 includes conventional operating components 11 that are well known to those skilled in the art. The operating components 11 include a spindle assembly 12 for rotating a workpiece (not shown), an X axis slide assembly 14, a cutting tool turret 15, and a Z axis slide assembly 16 for manipulating a cutting tool (not shown) relative to the workpiece as the workpiece is rotated in the spindle 12. The spindle 12, the turret 15, and the X and Z axis slide assemblies 14 and 16 are mounted on and supported by a bed element 18 that is part of the structural frame 20 of the lathe 10.

Figure 2:
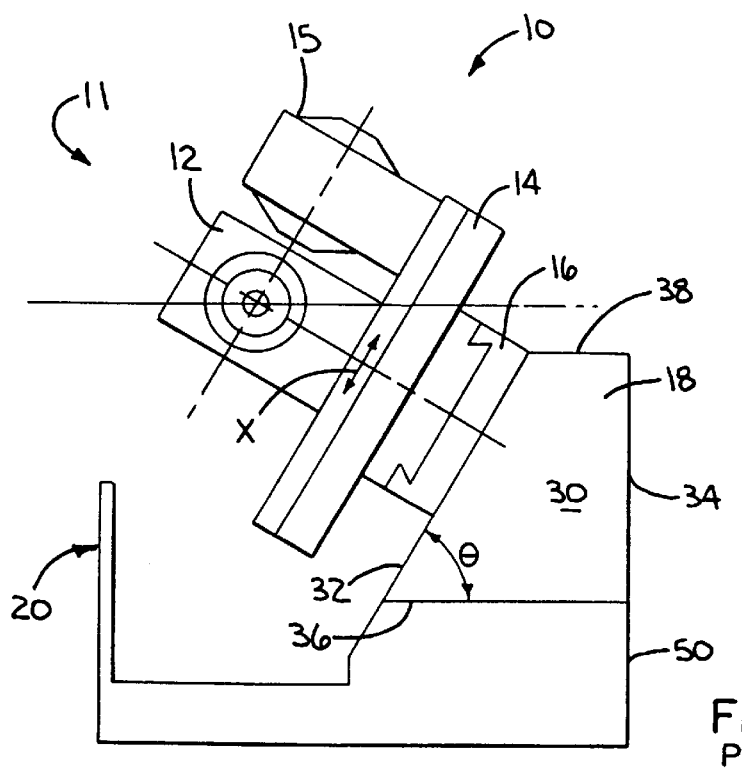
FIG. 2 is a right side elevation view of the slant-bed tool shown in FIG. 1.

As seen in FIG. 2, the bed element 18 of the slant-bed lathe 10 has an essentially trapezoidal cross section 30 defined by two nonparallel surfaces 32 and 34, and two horizontally-extending parallel surfaces 36 and 38. The nonparallel surface 32 mounts and supports the operating components 11. The horizontal surface 36 serves to mount the bed element 18 to a base element 50 of the structural frame 20. A slant angle $\Theta$ for the slant-bed lathe 10 is determined by the angle of intersection between the slanted surface 32 and the horizontal surface 36.

Typically, the bed element 18 will be an iron casting, with each of the surfaces 32, 34, 36, and 38 being essentially defined during the casting process.

It will be appreciated, by those skilled in the art, that a new casting along with a new set of mold tooling must be provided every time a different slant angle $\Theta$ is desired for the bed element 18 and the lathe 10.

Figure 5:
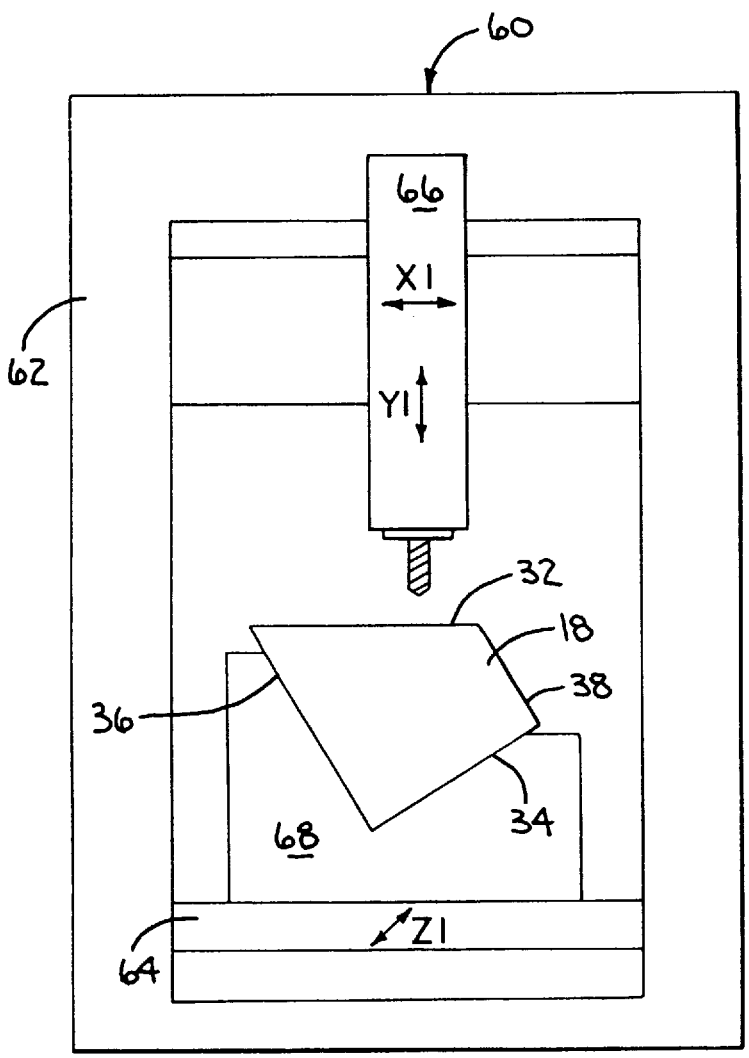
FIG. 5 is a front elevation view of a gantry-type milling machine having a conventional slant-bed structural frame element mounted thereon for machining.

After the casting for the bed element 18 has been formed, the surface 32 is machined to precision form a support structure for the operating components 11. Due to the relatively large size of the bed element 18, the bed element 18 is typically machined on a conventional gantry-type milling machine 60, as shown in FIG. 5. The milling machine 60 has a gantry 62 spanning a horizontally-extending machining table 64. The gantry 62 and the table 64 are capable of relative movement to define a first horizontal machining axis Z1. The gantry 62 provides support for a cutting tool spindle 66 that is translatable along a second horizontal machining axis X1 and a vertical machining axis Y1 relative to the gantry 62 and the table 64. A custom jig 68 supports and positions the bed element 18 on the machining table 64 so that the surface 32 is parallel with the horizontal machine plane X1-Z1 of the milling machine 60. The jig 68 is required because the machining tables 64 of conventional gantry-type milling machines 60 are not provided with a tilting feature due to the relatively large size of the machining tables 64.

It will be appreciated by those skilled in the art that a different custom jig 68 must be provided for machining the casting of each bed element 18 having a different slant angle $\Theta$.

Figure 7:
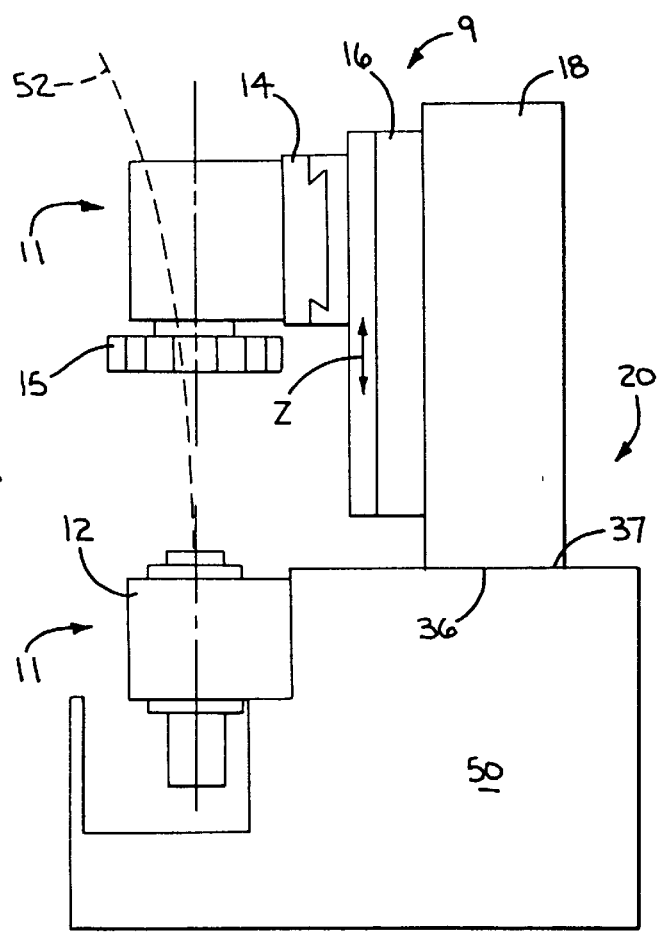
FIG. 7 is a right side elevation view of a conventional, vertical-bed machine tool.

A side elevation view of a prior art, vertical-bed machine tool is illustrated in FIG. 7 in the form of a CNC lathe 9. Similar to the lathe 10 shown in FIG. 1, the lathe 9 includes conventional operating components 11, such as a spindle assembly 12, an X slide axis assembly 14, a cutting tool turret 15, and a Z slide axis assembly 16. The X and Z axis slide assemblies 14,16 are mounted on and supported by a bed element 18 that is part of a structural frame 20 of the lathe 9, while the spindle 12 is mounted on and supported directly by a base element 50 of the structural frame 20. Similarly, a surface 36 of the bed element 18 is mounted on a horizontal surface 37 of the base element 50.

It will be appreciated by those skilled in the art, that the cantilevered weight of the operating components 14, 15 and 16 tends to deflect the bed element 18, thereby allowing the operating components 14, 15 and 16 to deviate from their desired position, as illustrated by the dashed center line 52 (deflection exaggerated for purpose of illustration). The accuracy of the lathe 9 is thereby decreased because the deflection inhibits the accurate alignment of a cutting tool with the workpiece.

It will also be appreciated by those skilled in the art, that the bed element 18 must be precisely located on the base 50 to provide accurate positional alignment of the spindle assembly 12 with the operating components 14, 15 and 16. Ultimately, this requires precision matched machining of surface 36 on the bed 18 and surface 37 on the base 50. This precision machining is expensive because the surfaces 36 and 37 are large and must be match-machined with the highest degree of accuracy. Commonly, this match-machining includes repeating the steps of hand scraping the surfaces 36 and 37, assembling the bed 18 to the base 50, and measuring the positional accuracy to determine if the desired accuracy for the final assembly has been achieved.

It will further be appreciated by those skilled in the art, that, to maintain the positional accuracy of the operating components 14, 15 and 16 relative to the spindle assembly 12, the bed 18 must be prevented from shifting in any way relative to the base 50. This further complicates the mounting of the bed 18 to the base 50 and, typically, requires a bolted joint.

Having described a conventional, prior art slant-bed machine tool and a conventional, prior art vertical-bed machine tool, the discussion will now turn to the preferred inventive embodiments.

Figure 3:
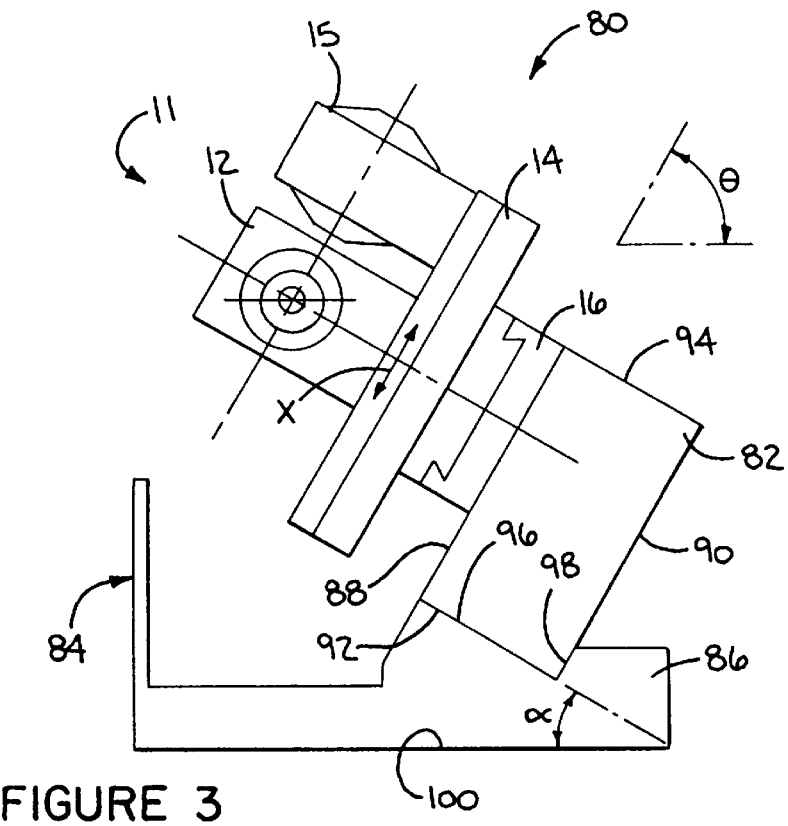
FIG. 3 is a right side elevation view of a slant-bed machine tool having a slant-bed structural frame embodying the present invention.

As shown in FIG. 3, the invention is embodied in a slant-bed machine tool 80 illustrated in the form of a CNC lathe. As with the lathe 10, the lathe 80 includes the previously discussed conventional operating components 11. The operating components 11 include the spindle assembly 12 and the X and Z axis slide assemblies 14 and 16. Each of the operating components 11 is mounted to and supported by a bed element 82 of a structural frame 84. The bed element 82 is mounted to and supported by a base element 86 of the structural frame 84.

The bed element 82 has an essentially rectangular cross section defined by four substantially flat surfaces 88, 90, 92 and 94. The surface 88 is formed at least partially by a machining process and serves to mount and support the operating components 11. The surface 92 of the bed element 82 and a slanted, oblique surface 96 of the base element 86 cooperate to mount the bed element 82 to the base element 86. As shown, but not necessarily required, another slanted, oblique surface 98 of the base element 86 cooperates with the surface 90 of the bed element 82 to assist in mounting the bed element 82 to the base element 86. It will be appreciated that either of the cooperating surfaces 92 and 96 or 98 and 90 may be employed by themselves to mount the bed element 82 to the base element 86.

The bed element 82 may be secured to the base element 86 at the interface between the surfaces 92 and 96 or the interface between the surfaces 90 and 98 by any of the fastening or joining methods commonly known and employed by those skilled in the art, such as, but not limited to, threaded fasteners or epoxy.

Unlike the conventional slant-bed machine tool 10 wherein the slant angle $\Theta$ is determined by the geometry of the bed element 18, the slant angle $\Theta$ for the slant-bed machine tool 80 is determined by the geometry of the base element 86. More specifically, the slant angle $\Theta$ is determined by the relative angle $\alpha$ between the slanted surface 96 and a horizontally-extending base surface 100 of the base element 86.

Because the bed element 82 provides the machined surface 88 which mounts and supports the operating components 11, the stress and thermal related distortions and the precision forming of the bed element 82 are more critical to the operation of the slant-bed machine tool 80 than the forming and distortions of the base element 86. By providing a slant-bed structural frame 84 wherein the slant angle $\Theta$ is determined by the base element 86, rather than by the more critical bed element 82, an entire product line of slant-bed machine tools 80 having different slant angles $\Theta$ may be provided while utilizing a standard bed element 82. This eliminates the re-analysis of thermal and stress-related distortions required for conventional bed elements 18 because every one of the slant-bed machine tools 80 in the product line will employ the standard bed element 82, obviously, because the stress and thermal related distortions of the base element 86 are not as critical as the distortions of the bed element 82 to the operation of the slant-bed machine tool 80, the base element 86 does not require the same level of analysis as the bed element 82.

Further, because a standard bed element 82 is used for the product line of slant-bed machine tools 80, a slant-bed machine tool manufacturer will only have to provide, maintain, and store the mold tooling for a single casting for the bed element 82, rather than the multiple sets of mold tooling required for the conventional bed elements 18.

Assembly of the slant-bed machine tools 80 is also simplified because the operating components 11 can be assembled onto the machined surface 88 while the bed element 82 is supported on surface 90. No special assembly tools are required because the weight of the operating components is supported by the machined surface 88. After the operating components 11 are assembled onto the bed element 82, the bed element 82 may be mounted onto the base element 86.

Additionally, because the precision forming of the base element 86 is not as critical as the precision forming of bed element 82 to the operation of the machine tool 80, the base element 86 need not be as accurately formed as the bed element 82. Accordingly, the shoe 86 may be formed by any of the methods commonly used by those skilled in the art to form structural bases or frames for machine tools. In one such method, the base element 86 will be formed from cast iron. In another such method, the base element 86 is formed from a poured concrete/epoxy material or by a poured granite/epoxy material. Regardless of the method used in forming the base element 86, the surfaces 96 and 98 may be utilized in their as-cast or as-poured condition without any machining of these surfaces being required.

Figure 6:
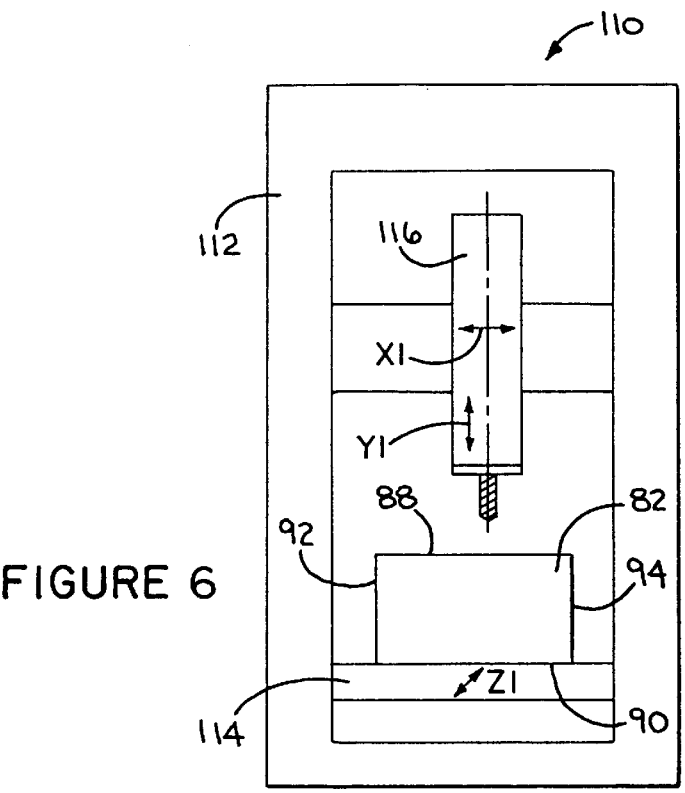
FIG. 6 is a front elevation view of a gantry-type milling machine having a slant-bed structural frame member embodying the present invention mounted thereon for machining.

Preferably, the bed element 82 is formed from a casting of iron. The surfaces 90 and 92 may be utilized in their as-cast condition without requiring any additional machining. However, the surface 88 must be machined to provide an accurate mount structure for mounting and supporting machine tool components 11. To accomplish this machining, the bed element 82 is mounted on a gantry-type milling machine 110, as seen in FIG. 6. As with the gantry 112-type milling machine 60 shown in FIG. 5, the milling machine 110 includes a gantry, a machine table 114, and a machine tool head 116. Unlike the machining of the conventional bed element 18, the machining of the bed element 82 does not require a jig 68 because the surface 88 is supported and located parallel to the horizontal machining plane X1-Z1 by the surface 90.

Because a jig 68 is not required for the machining of the bed element 82, the milling machine 110 may be smaller than the milling machine 60 used to machine a conventional bed element 18. This results in increased accuracy for the machine surface 88 and a reduction in cost for the machining of surface 88 because the smaller milling machine 110 will typically be more accurate and less expensive than the larger milling machine 60.

Figure 4:
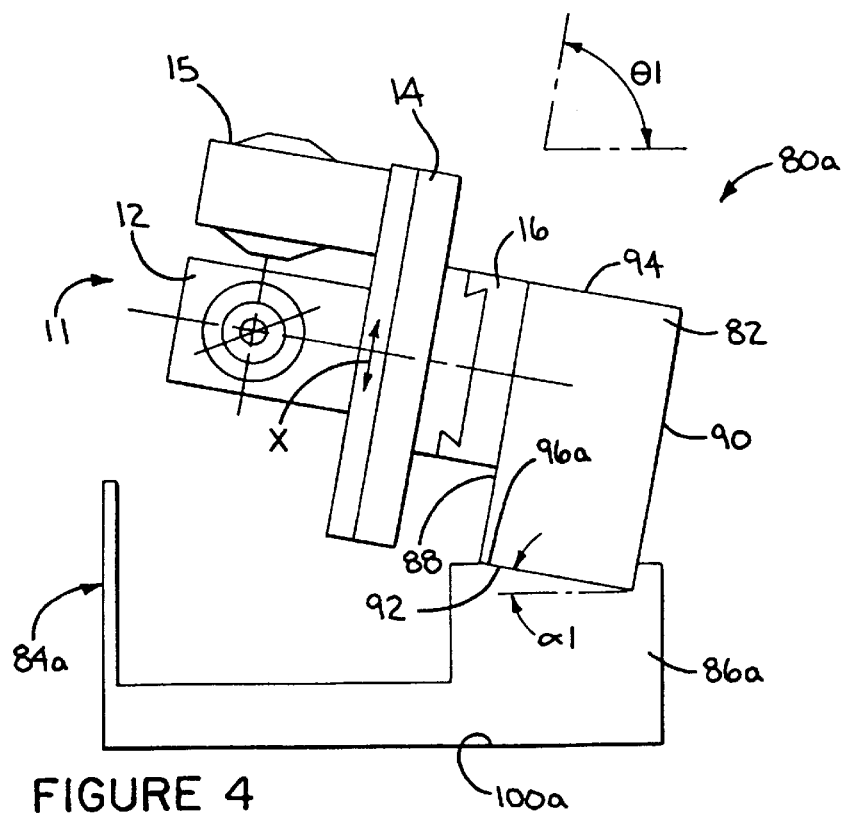
FIG. 4 is a right side elevation view of another slant-bed machine tool having a slant-bed structural frame embodying the present invention.

As seen in FIG. 4, the invention is further embodied in a slant-bed lathe 80a, shown in the form of a CNC lathe. The lathe 80a incorporates the bed element 82 and all the remaining components of the lathe 80 shown in FIG. 3, with the exception of the base element 86a on the structural frame 84 which is different from the base element 86, shown in FIG. 3 in that the angle α1 between the surfaces 96a and 100a is different than the angle α between surface of 96 and 100. A comparison of the slant-bed machine tools 80 and 80a reveals that, according to the present invention, the slant-bed machine tools 80 and 80a having different slant angles Θ and Θ1 are provided by mating the bed element 82 with either the base element 86 to provide the slant angle Θ or with the base element 86a to provide the slant angle Θ1.

Accordingly, it will be appreciated by those skilled in the art that a number of slant-bed machine tools 80, each having a different slant angle Θ, may be provided in an advantageous manner by mating a standard bed element 82 with different base elements 86 for each slant-bed machine tool 80.

Figure 8:
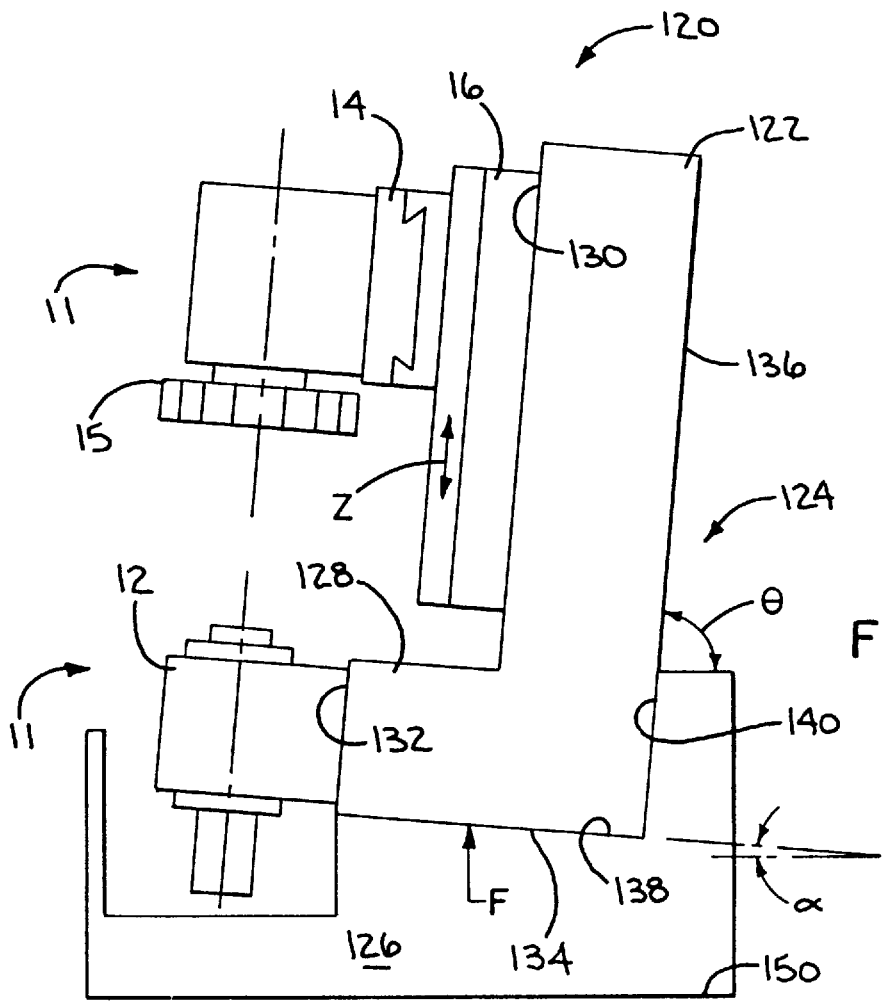
FIG. 8 is a right side elevation view of a vertical, slant-bed machine tool having a slant-bed structural frame embodying the present invention.

Turning now to the embodiment shown in FIG. 8, the invention is embodied in a vertical, slant-bed machine tool 120 illustrated in the form of a CNC lathe. As with the lathes 9, 10 and 80, the lathe 120 includes the previously discussed conventional operating components 11 (a spindle assembly 12, an X slide axis assembly 14, a cutting tool turret 15, and a Z slide axis assembly 16). All of the operating components 11 are mounted to and supported by a bed element 122 of a structural frame 124. The bed element 122 is mounted to and supported by a base element 126 of the structural frame 124.

The bed element 122 has an essentially rectangular cross section with a step 128 for mounting the spindle assembly 12. The bed element 122 is defined by four substantially flat surfaces 130, 132, 134, and 136. The surfaces 130 and 132 are formed at least partially by a machining process and serve to mount and support the operating components 11. The surface 134 and a slanted, oblique surface 138 of the base element 126 cooperate to mount the bed element 122 to the base element 126. As shown, but not necessarily required, another slanted, oblique surface 140 of the base element 126 cooperates with the surface 136 to assist in mounting the bed element 122 to the base element 126. It will be appreciated that either of the cooperating surfaces 134 and 138 or 136 and 140 may be employed by themselves to mount the bed element 122 to the base element 126.

As with the machine tools 80 and 80a, the bed element 122 may be secured to the base element 126 at the interface between the surfaces 134 and 138 or the interface between the surfaces 136 and 140 by any of the fastening or joining methods commonly known and employed by those skilled in the art, such as, but not limited to, threaded fasteners or epoxy.

Unlike the conventional vertical-bed machine tool 9, wherein the positional accuracy of the operating components 14, 15 and 16 relative to the spindle assembly 12 is determined by the accuracy of the surfaces 36 and 37, the positional accuracy for the slant-bed machine tool 120 is determined by the accuracy of the surfaces 130 and 132. This is because a spindle assembly 12 is mounted to the surface 130 and the operating components 14, 15 and 16 are mounted to the surface 132. By mounting all of the operating components 11 on a single structural member, the bed 122, the slant-bed machine tool 120 eliminates the need for precisely locating the bed element 122 relative to the base element 126, thereby eliminating the requirement for precision match-machining of the bed and base elements 122 and 126.

Further, because the bed element 122 provides both the surfaces 130 and 132 which mount and support the operating components 11, the stress, thermal-related distortions, and precision-forming of the bed element 122 are more critical to the operation of the slant-bed machine tool 120 than the forming and distortions of the base element 126. This allows for more flexibility in the manufacture of the base element 126 when compared to the base element 50 of the conventional vertical-bed machine tool. Accordingly, as with the base 86 of machine tool 80, the base 126 may be formed by any of the methods commonly used by those skilled in the art to form structural bases or frames for machine tools. Regardless of the method used in forming the base element 86, the surfaces 134,136 of the bed element 122 and surfaces 138,140 of the base element 126 may be utilized in their as-cast or as-poured condition, rather than the relatively expensive match-machined surfaces 36 and 37 of the conventional, vertical-bed machine tool 9.

As with the machine tools 80,80a, the machine tool 120 is provided with a slant angle Θ that is determined by the relative angle α between the slanted surface 134 and a horizontally-extending base surface 150 of the base element 126.

The slant angle Θ for the vertical, slant-bed machine tool 120 compensates for the gravity-induced deflection of the bed element 122 caused by the bending forces from the weight of the cantilevered operating components 14, 15 and 16. The appropriate slant angle Θ is dependent upon the weight and relative position of the operating components 14, 15 and 16 on the bed element 122, and the rigidity/stiffness of the bed element 122. There are a number of ways to select an appropriate slant angle Θ. For example, the gravity-induced deflection of the bed element 122 in the absolute vertical position can be determined and then the appropriate slant angle Θ can be selected to counter this deflection. Another approach is to minimize the bending forces by aligning the combined center of gravity for the operating components 14, 15 and 16 with the force vector F determined by the center of force between the surfaces 134 and 138, and 136 and 140.

I claim:

1. A structural frame kit for a slant-bed machine tool, said frame kit comprising:

a bed element having a machined, flat surface defining a support for an operating component of the machine tool;

a first base element;

first means cooperating between the first base element and the bed element for maintaining the bed element in an operative position on the first base element wherein the machined, flat surface is at a first slant angle that is neither fully vertical nor fully horizontal;

a second base element;

second means cooperating between the second base element and the bed element for maintaining the bed element in an operative position on the second base wherein the machined, flat surface is at a second slant angle that is neither fully vertical nor fully horizontal, the second slant angle being different from the first slant angle; and the bed element being selectively mated with only one of the first and second base elements at a time to provide one of the first and second slant angles.

2. The frame kit of claim 1 wherein:

the first cooperating means comprises a first surface on the bed element and a second surface on the first base element; and the second cooperating means comprises the first surface on the bed element and a third surface on the second base element.

3. The frame kit of claim 2 wherein the first surface is a cast surface.

4. The frame kit of claim 2 wherein the first surface is a flat surface on which the bed element can be supported in a machining position and the machined, flat surface is parallel to the first surface and at least partially formed with the bed element supported on the first surface.

5. A process for manufacturing a slant-bed structural frame for a machine tool, said process comprising the steps of:

forming a bed element having a first flat surface on which the bed element can be supported in a machining position;

supporting the bed element on the first flat surface in the machining position;

machining a second flat surface on the bed element, said second surface defining a support for an operating component of the machine tool;

forming a first base element having a third surface for maintaining the bed element in an operative position on the first base element wherein the second surface of the bed element is at a first slant angle that is neither fully vertical nor fully horizontal when the bed element and the first base element are mated together; and forming a second base element having a fourth surface for maintaining the bed element in an operative position on the base wherein the second surface of the bed element is at a second slant angle that is neither fully vertical nor fully horizontal, the second slant angle being different from the first slant angle; and selectively mating together the bed element and one of the first base element at the third surface and the second element at the fourth surface.

6. A structural frame combination for a slant-bed machine tool, said combination comprising:

a bed element having a first flat surface on which the bed element can be supported in a machining position and a second machined, flat surface that is parallel to the first surface and at least partially formed with the bed element supported on the first surface, said second surface defining a support for an operating component of the machine tool;

a base element;

means cooperating between the base element and the bed element for maintaining the bed element in an operative position on the base element wherein the second surface is at a first slant angle that is neither fully vertical nor fully horizontal, the operative position being selected to compensate for gravity-induced deflection of the bed element; a second base element and a second means cooperating between the second base element and the bed element for maintaining the bed element in an operating position on the base element wherein the second surface is at a second slant angle that is not fully vertical nor fully horizontal, the second slant angle being different from the first slant angle; and wherein the bed element is selectively mated with one of the first and second base elements at a time to provide one of the first and second slant angles.

7. The combination of claim 6, wherein the first flat surface is a cast surface.

8. The combination of claim 6 wherein the cooperating means comprises the first surface on the bed element and a third surface on the base element.

9. The combination of claim 6 wherein the cooperating means comprises a third surface on the base element and at least one of the first surface and a fourth surface on the bed element.

10. The combination of claim 6 wherein:

the first cooperating means comprises the first surface on the bed element and a third surface on the first base element; and the second cooperating means comprises the first surface of the bed element and a fourth surface on the second base element.

* * * * *